US012735764B2

(12) United States Patent
Raupenstrauch et al.

(10) Patent No.: US 12,735,764 B2
(45) Date of Patent: Sep. 15, 2026

(54) APPARATUS AND PROCESS FOR THERMAL TREATMENT OF RAW MATERIAL CONTAINING LITHIUM COMPOUNDS AND PHOSPHORUS COMPOUNDS, METHOD OF RECOVERING LITHIUM AND/OR PHOSPHORUS FROM RESIDUE MATERIAL OF LITHIUM-ION BATTERIES

(71) Applicants: MONTANUNIVERSITÄT LEOBEN, Leoben (AT); Andreas Schönberg, Graz (AT)

(72) Inventors: Harald Raupenstrauch, St. Radegund bei Graz/Rinnegg (AT); Stefan Windisch, Leoben (AT); Christoph Ponak, Graz (AT); Valentin Mally, Leoben (AT); Alexandra Holzer, Neuberg/Mürz (AT); Andreas Schönberg, Graz (AT)

(73) Assignee: Montanuniversitat Leoben, Leoben (AT)

( * ) Notice: Subject to any disclaimer, the term of this patent is extended or adjusted under 35 U.S.C. 154(b) by 1049 days.

(21) Appl. No.: 17/905,475

(22) PCT Filed: Feb. 25, 2021

(86) PCT No.: PCT/EP2021/054734
§ 371 (c)(1),
(2) Date: Sep. 1, 2022

(87) PCT Pub. No.: WO2021/175703
PCT Pub. Date: Sep. 10, 2021

(65) Prior Publication Data

US 2023/0227939 A1 Jul. 20, 2023

(30) Foreign Application Priority Data

Mar. 2, 2020 (WO) ................ PCT/EP2020/055449

(51) Int. Cl.
*C22B 1/02* (2006.01)
*C22B 26/12* (2006.01)

(52) U.S. Cl.
CPC ................ *C22B 1/02* (2013.01); *C22B 26/12* (2013.01); *Y02P 10/20* (2015.11); *Y02W 30/84* (2015.05)

(58) Field of Classification Search
None
See application file for complete search history.

(56) References Cited

U.S. PATENT DOCUMENTS 6,502,520 B1 * 1/2003 Nishi ........................ F23G 5/16 110/211
2009/0266200 A1 10/2009 Edlinger
(Continued)

FOREIGN PATENT DOCUMENTS

JP H11218600 A * 8/1999
WO WO 96/41348 A1 12/1996
WO WO 2006/029162 A1 3/2006
WO WO 2006/079132 A1 8/2006

OTHER PUBLICATIONS

International Search Report of PCT/EP2020/055449, Oct. 29, 2020, 5 pages.
(Continued)

*Primary Examiner* — Jennifer A Leung
(74) *Attorney, Agent, or Firm* — Womble Bond Dickinson (US) LLP

(57) ABSTRACT

The present invention relates to an apparatus for thermal treatment of a raw material containing lithium compounds and phosphorus compounds, a process for thermal treatment of a raw material containing lithium compounds and phosphorus compounds and a method of recovering lithium and/or phosphorus from residue material of lithium-ion batteries. The apparatus for thermal treatment of a raw
(Continued)

material containing lithium compounds and phosphorus compounds comprises an inductively heated, packed bed reactor comprising a reactor body at least partially made of refractory material, the reactor body being surrounded by at least one induction coil, the reactor body being at least partially filled/packed with a susceptor material, the inductively heated packed bed reactor being configured for transferring at least part of the raw material including lithium compounds and/or phosphorus compounds into a gaseous phase and configured for forming a molten phase from another part of the raw material, the inductively heated packed bed reactor comprising one or more gas outlets and a molten phase outlet, and a condenser in fluidic connection with the one or more gas outlets and configured for depositing lithium species from a gaseous phase discharged from the packed bed reactor via the one or more gas outlets and configured for separating the deposited lithium species from an exhaust gas substantially free from lithium species.

20 Claims, 2 Drawing Sheets

(56) References Cited

U.S. PATENT DOCUMENTS

2011/0179907 A1 7/2011 Edlinger
2012/0247005 A1 10/2012 Jaeger et al.
2013/0272944 A1 10/2013 Edlinger

OTHER PUBLICATIONS

Written Opinion of International Searching Authority for PCT/EP2020/055449, Oct. 29, 2020, 8 pages.
International Search Report of PCT/EP2020/054734, May 26, 2021, 6 pages.
Written Opinion of International Searching Authority for PCT/EP2020/054734, May 26, 2021, 8 pages.

* cited by examiner

APPARATUS AND PROCESS FOR THERMAL TREATMENT OF RAW MATERIAL CONTAINING LITHIUM COMPOUNDS AND PHOSPHORUS COMPOUNDS, METHOD OF RECOVERING LITHIUM AND/OR PHOSPHORUS FROM RESIDUE MATERIAL OF LITHIUM-ION BATTERIES

This application is the U.S. national phase of International Application No. PCT/EP2021/054734 filed 25 Feb. 2021 which designated the U.S. and claims priority to International Patent Application No. PCT/EP2020/055449 filed 2 Mar. 2020, the entire contents of each of which are hereby incorporated herein by reference.

FIELD OF THE INVENTION

The present invention relates to an apparatus for thermal treatment of a raw material containing lithium compounds and phosphorus compounds, a process for thermal treatment of a raw material containing lithium compounds and phosphorus compounds and a method of recovering lithium and/or phosphorus from residue material of lithium-ion batteries.

BACKGROUND

Lithium-ion batteries gain more and more importance, as they are widely utilized in portable electronic devices and electric vehicles, but also in many other fields of application. Though being rechargeable, the lifetime of lithium-ion batteries is not endless. In fact, their performance and capacity gradually decreases, which makes it necessary to replace lithium-ion batteries after a certain period of time. As a result, ever growing amounts of lithium-ion battery waste are generated. The residue of lithium-ion batteries, in particular of the active material thereof, such as electrodes and electrolytes, which may be obtained as a fine-grained residue from lithium-ion battery processing, contains valuable materials so that recycling thereof and the recovery of these materials is not only desirable for ecological reasons (in terms of conversation of resources), but also economically interesting. Besides transition metals, such as iron, copper, nickel or cobalt, the recovery of in particular lithium compounds and phosphorus compounds have attracted increased attention. Due to the fast development of new cell technologies and different pre-treatment methods, the active material in which most of the lithium is contained and bound in different metal oxide or iron phosphate structures has a variable chemical composition, all the more at the end of the lifetime of a lithium-ion battery after having undergone repeated reactions. In addition to various lithium metal oxides, lithium iron phosphates and possible other structures, the active material often also contains large amounts of carbon (typically up to 30% mass content) as well as residues from the cell structure and copper or aluminum foil residues, which may be volatile at high temperatures.

Thus, there may be a need to provide a technique for treating residue material of lithium-ion batteries, in particular the active material thereof, such that not only transition metals, but also lithium and phosphorus may be efficiently recovered in high purity and/or yield in a versatile manner, i.e. irrespective of the chemical structure or composition of the raw material.

SUMMARY OF THE INVENTION

This need may be met by an apparatus for thermal treatment of a raw material containing lithium compounds and phosphorus compounds, a process for thermal treatment of a raw material containing lithium compounds and phosphorus compounds and a method of recovering lithium and/or phosphorus from residue material of lithium-ion batteries according to the independent claims.

The present invention in particular relates to an apparatus for thermal treatment of a raw material containing lithium compounds and phosphorus compounds, the apparatus comprising an inductively heated, packed bed reactor comprising a reactor body at least partially made of refractory material, the reactor body being surrounded by at least one induction coil, the reactor body being at least partially filled with a susceptor material, the inductively heated packed bed reactor being configured for transferring at least part of the raw material including lithium compounds and/or phosphorus compounds into a gaseous phase and configured for forming a molten phase from another part of the raw material, the inductively heated packed bed reactor comprising one or more gas outlets and a molten phase outlet, and a condenser in fluidic connection with the one or more gas outlets and configured for depositing lithium species from a gaseous phase discharged from the packed bed reactor via the one or more gas outlets and configured for separating the deposited lithium species from an exhaust gas substantially free from lithium species.

The present invention further relates to a process for thermal treatment of a raw material containing lithium compounds and phosphorus compounds, the process comprising the steps of providing the raw material, optionally pretreating the raw material, optionally supplying additives to the raw material, feeding the raw material to an inductively heated, packed bed reactor, in particular an inductively heated packed bed reactor as described in connection with an apparatus for thermal treatment of a raw material containing lithium compounds and phosphorus compounds, thermally treating the raw material in the inductively heated packed bed reactor, such that at least part of the raw material including lithium compounds and/or phosphorus compounds is transferred into a gaseous phase and another part of the raw material forms a molten phase, discharging at least part of a gaseous phase comprising at least part of the transferred part of the raw material including lithium species and/or phosphorus species in a gaseous phase from the reactor via one or more gas outlets, discharging the molten phase from the reactor via a molten phase outlet, cooling the discharged gaseous phase in a condenser thereby depositing lithium species, and separating the deposited lithium species from an exhaust gas substantially free from lithium species.

In addition, the present invention relates to a method of recovering lithium and/or phosphorus from residue material of lithium-ion batteries comprising conducting a process for thermal treatment of a raw material containing lithium compounds and phosphorus compounds as described herein.

The apparatus for thermal treatment of a raw material containing lithium compounds and phosphorus compounds may hereinafter also simply referred to as a "thermal treatment apparatus", the process for thermal treatment of a raw material containing lithium compounds and phosphorus compounds may hereinafter also simply referred to as a "thermal treatment process" and the method of recovering lithium and/or phosphorus from residue material of lithium-ion batteries may hereinafter also simply referred to as a "recovery method".

Other objects and many of the attendant advantages of embodiments of the present invention will be readily appreciated and become better understood by reference to the following detailed description of embodiments and the accompanying drawings.

DETAILED DESCRIPTION OF THE INVENTION

Figure 1:
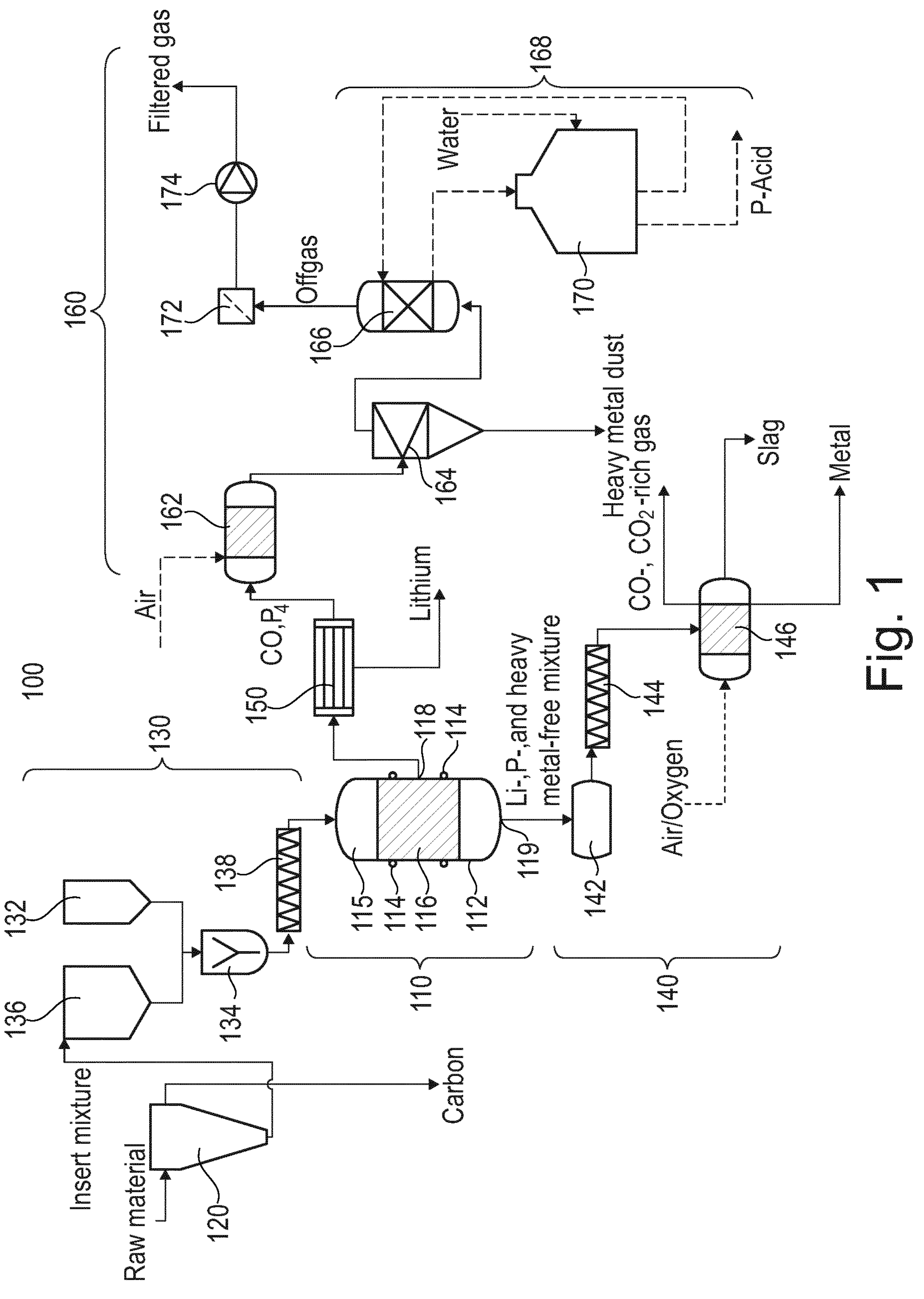
FIG. 1 illustrates an exemplary scheme of a thermal treatment apparatus and a thermal treatment process according to an exemplary embodiment.

Hereinafter, details of the present invention and other features and advantages thereof will be described. However, the present invention is not limited to the following specific descriptions, but they are for illustrative purposes only.

It should be noted that features described in connection with one exemplary embodiment or exemplary aspect may be combined with any other exemplary embodiment or exemplary aspect, in particular features described with any exemplary embodiment of the thermal treatment apparatus may be combined with any exemplary embodiment of a thermal treatment process or with any exemplary embodiment of a recovery method and vice versa, unless specifically stated otherwise.

Where an indefinite or definite article is used when referring to a singular term, such as "a", "an" or "the", a plural of that term is also included and vice versa, unless specifically stated otherwise, whereas the word "one" or the number "1", as used herein, typically means "just one" or "exactly one".

The expressions "comprising", "including" or "containing" do not exclude other elements or steps and, as used herein, include not only the meaning of "comprising", "including" or "containing", but may also encompass "consisting essentially of" and "consisting of".

Unless specifically stated otherwise, the expression "at least partially", "at least a partial" or "at least a part of", as used herein, may mean at least 5% thereof, in particular at least 10% thereof, in particular at least 15% thereof, in particular at least 20% thereof, in particular at least 25% thereof, in particular at least 30% thereof, in particular at least 35% thereof, in particular at least 40% thereof, in particular at least 45% thereof, in particular at least 50% thereof, in particular at least 55% thereof, in particular at least 60% thereof, in particular at least 65% thereof, in particular at least 70% thereof, in particular at least 75% thereof, in particular at least 80% thereof, in particular at least 85% thereof, in particular at least 90% thereof, in particular at least 95% thereof, in particular at least 98% thereof, and may also mean 100% thereof.

In a first aspect, the present invention relates to an apparatus for thermal treatment of a raw material containing lithium compounds and phosphorus compounds, the apparatus comprising an inductively heated, packed bed reactor comprising a reactor body at least partially made of (electrically non-conductive) refractory material, the reactor body being surrounded by at least one induction coil, the reactor body being at least partially filled/packed with a (bed of) susceptor material, the inductively heated packed bed reactor being configured for transferring at least part of the raw material including lithium compounds and/or phosphorus compounds into a gaseous phase and configured for forming a molten phase from another part of the raw material, the inductively heated packed bed reactor comprising one or more gas outlets (which may be located at an upper part of the reactor body) and a molten phase outlet (which may be located at a lower or bottom part of the reactor body), and a condenser in fluidic connection with the one or more gas outlets and configured for depositing lithium species from a gaseous phase discharged from the packed bed reactor via the one or more gas outlets and configured for separating the deposited lithium species from an exhaust gas substantially free from lithium species.

In an embodiment, the raw material comprises residues from processing of lithium-ion batteries and/or parts from lithium-ion batteries, in particular active material, electrodes and/or electrolyte material thereof. The raw material may contain lithium compounds and phosphorus compounds in various oxidation states and structures (i.e. combined with atoms or ions of other elements). Thus, the raw material may contain mixtures of several lithium- and/or phosphorus-containing compounds. In addition, the raw material may comprise other metals, in particular transition metals, such as at least one of iron, copper, nickel and cobalt, and/or aluminum. These metals may be present in elemental form and/or as salts and/or as oxides. Moreover, the raw material may comprise organic material, such as carbon or coke, for instance in an amount up to 30% by mass, and/or further inorganic materials, such as salts or oxides.

The thermal treatment apparatus comprises an inductively heated, packed bed reactor. The inductively heated, packed bed reactor comprises a reactor body.

The term "inductively heated", as used herein, may in particular denote that the reactor is heated by electromagnetic induction through heat generated by eddy currents. In particular, the reactor may be inductively heated by means of one or more induction cons surrounding the reactor body and a susceptor material within the reactor body, thereby allowing an indirect heating of the reactor so that the material to be thermally treated is not in direct contact with the induction coils.

The term "packed bed", as used herein, may in particular denote that the reactor, more specifically the reactor body, contains a bed of packing material, i.e. the reactor body is at least partially filled with a packing material forming a bed of packing material therein. Hereby, an improved contact between two phases can be achieved, for instance between a gaseous phase and the solid phase of the packing material and/or a liquid or molten phase and the solid phase of the packing material.

In an embodiment, the reactor body is at least partially made of refractory material, preferably an electrically non-conductive refractory material. The term "refractory material", as used herein, may in particular denote a material that is resistant to heat and may preferably be realized by a mineral or ceramic material that is resistant to decomposition by heat, pressure and/or chemical attack.

In an embodiment, the reactor body is surrounded by at least one induction coil, such as 1, 2, 3, 4, 5 or more induction coils. In an embodiment, the induction coil comprises a liquid-cooled, in particular water-cooled, induction coil. The term "induction coil", as used herein, may in particular denote a coil which may be wound around a reactor body and comprises a hollow body (such as a tube or a pipe) made of a metal, for instance copper, which may be filled with a liquid, such as water, for cooling.

In an embodiment, the reactor body is at least partially filled/packed with a (bed of) susceptor material. The term "susceptor material", as used herein, may in particular denote a material that is capable of absorbing electromagnetic energy and converting it to thermal energy (heat). The electromagnetic energy absorbed by the susceptor material may in particular be generated by the of one or more induction coils surrounding the reactor body. The susceptor material may be present as a packed bed within the reactor body. The susceptor material may be shaped as bodies, in particular as regular and/or irregular bodies, such as blocks, fragments or cubes.

In an embodiment, the susceptor material does (substantially) not react with the raw material in the packed bed reactor. As a result, the susceptor material is substantially not consumed. Rather, the susceptor material generally serves to convert electromagnetic energy to thermal energy.

In an embodiment, the susceptor material comprises graphite, in particular graphite bodies. Other susceptor materials are however also possible.

In an embodiment, the susceptor material, such as graphite bodies, is arranged within the reactor body such that the (average) particle size of the susceptor material varies in a radial direction, in particular such that the particle size of the susceptor material decreases from the center to the periphery (circumference) of the reactor body, i.e. the (average) particle size of the susceptor material may be larger at the center (in a radial direction) of the reactor body (which may thus also be referred to as "susceptor material inner packed bed") than at the periphery of the reactor body (which may thus also be referred to as "susceptor material outer packed bed"). For instance, the mean particle size of the susceptor material at the center of the reactor body may be at least four times (such as at least five times) larger than the mean particle size of the susceptor material at the periphery of the reactor body. In other words, the mean (average) particle size of the susceptor material outer packed bed may be one fourth or smaller than the mean (average) particle size of the susceptor material inner packed bed, or a ratio of the (average) particle size of the susceptor material inner packed bed to the (average) particle size of the susceptor material outer packed bed may be 4:1 or more, such as 5:1 or more.

In an embodiment, the susceptor material may be arranged in a radial direction within the reactor body in two or more annular portions around a central point forming a central cylinder and one or more (surrounding) cylindric layers, wherein the particle size of the susceptor material of an inner annular portion (e.g., of the central cylinder, in a susceptor material inner packed bed) is larger than the particle size of the susceptor material of an outer annular portion (e.g., of the cylindrical layer(s), in a susceptor material outer packed bed). For instance, a thickness of the outer annular portion may be in the same order of magnitude as (in particular substantially correspond to) the mean (average) particle size of the susceptor material inner packed bed. It may also be possible that the particle size gradually decreases from the center (e.g., from a susceptor material inner packed bed) to the periphery (circumference; e.g., to a susceptor material outer packed bed) of the reactor body. By such selective distribution of the susceptor material, the inductive heat input at the edge of the packed bed may be reduced leading to a reduced thermal load on the refractory material. In addition, the penetration of a melting phase and consequently also a chemical attack of the refractory material may be minimized. Moreover, a separation between a gaseous phase and a molten phase may be improved and an (undesired) contact between the gaseous phase and a molten or solid phase may be minimized.

In an embodiment, the reactor body comprises an upper part (which may thus also be referred to as "reactor body upper reactor part" or "upper reactor part") comprising one or more induction coils (which may thus also be referred to as "induction coils upper reactor part" or "upper induction coils") and a lower part (which may thus also be referred to as "reactor body lower reactor part" or "lower reactor part") comprising one or more induction coils (which may thus also be referred to as "induction coils lower reactor part" or "lower induction coils"). The reactor body upper reactor part and the reactor body lower reactor part may be connected to each other via a connecting section. In particular, the connecting section may comprise a gas area (i.e. a space that is not filled with solid or liquid material) and a gas outlet. By taking this measure, a degassing of slag may be achieved, which is particular advantageous if gas-generating reactions occur when the raw material is thermally treated in the inductively heated packed bed reactor which gas-generating reactions may result in a foam-like (or foamed) slag.

In an embodiment, the reactor body upper reactor part and the reactor body lower reactor part are (arranged) offset, in particular laterally (horizontally, axially) offset, from each other at the connection section. Thus, the central axis of the reactor body upper reactor part and the central axis of the reactor body lower reactor part may be different, in particular the central axis of the reactor body lower reactor part may be laterally offset from the central axis of the reactor body upper reactor part. For instance, the lateral (horizontal, axial) offset (horizontal center distance) of the reactor body upper reactor part and the reactor body lower reactor part may be in the same order of magnitude as (in particular substantially correspond to) the reactor body diameter, or, if the diameters of the two reactor body parts differ from each other, in the same order of magnitude as (in particular substantially correspond to) the sum of their radii. By taking this measure, a mutual influence of the upper induction coils and the lower induction coils can be reduced and an improved separate (independently from each other) control of the reactor body upper reactor part and the reactor body lower reactor part may be enabled.

In an embodiment, the inductively heated packed bed reactor is configured for transferring at least part of the raw material including lithium compounds and/or phosphorus compounds into a gaseous phase and is configured for forming a molten phase from another part of the raw material. The raw material as fed to the inductively heated packed bed reactor is typically solid. By thermally treating or heating the raw material within the reactor body of the inductively heated packed bed reactor, a part of the raw material may be transferred into a gaseous phase (e.g. vaporized) and another part of the raw material may be transferred into a molten phase (i.e. melted). The gaseous phase may in particular contain lithium compounds and/or phosphorus compounds, whereas the molten phase may in particular contain other metals of the raw material, such as iron, copper, nickel, cobalt and/or aluminum. Thus, the inductively heated packed bed reactor may be capable of thermally treating the raw material under such conditions (in particular, temperature, pressure and/or atmosphere) that solid raw material is partly transferred into a gaseous phase including lithium compounds and/or phosphorus compounds and partly transferred into a molten or liquid phase including other metals of the raw material.

In an embodiment, the inductively heated packed bed reactor comprises one or more gas outlets, which may be located at an upper part of the reactor body or at least at a higher position of the reactor body than a molten phase outlet and through which the above described gaseous phase may be discharged (i.e. leave or exit the inductively heated packed bed reactor).

In an embodiment, the inductively heated packed bed reactor comprises two or more gas outlets located at axially different heights of the reactor body. By taking this measure, the gas flow through the packed bed may be improved and/or an undesired contact with other phases (such as the molten phase) may be reduced.

In an embodiment, the inductively heated packed bed reactor comprises a molten phase outlet, which may be located at a lower or bottom part of the reactor body and through which the above described molten phase (or any solid or liquid phase) may be discharged (i.e. leave or exit the inductively heated packed bed reactor).

In an embodiment, the molten phase outlet is configured for being purged by an inert gas (i.e. the molten phase outlet can be purged by an inert gas while the molten phase is discharged). By taking this measure, an (undesired) oxidation of metals in the molten phase may be substantially avoided or at least suppressed.

In an embodiment, the thermal treatment apparatus further comprises a pretreatment unit upstream of the inductively heated, packed bed reactor. The pretreatment unit is configured for (e.g. mechanically) pretreating the raw material. By taking this measure, the raw material may be pretreated, in particular mechanically pretreated and/or by density or magnetic separation, for instance so as to reduce its carbon content depending on the carbon content of the raw material. To this end, the pretreatment unit may comprise for instance a separator or a sifter.

In an embodiment, the thermal treatment apparatus further comprises an additive supply unit upstream of the inductively heated, packed bed reactor and downstream of an optional pretreatment unit. The additive supply unit is configured for supplying one or more additives, such as mineral components, slag-forming oxides, blast furnace slag, industrial or municipal residues, reactive carbon or carbon source, and mixtures thereof, to the raw material. By taking this measure, the further processing by thermal treatment of the raw material may be improved, in particular in that any deficits in the composition of the raw material may be compensated, as will be explained in further detail below in connection with the thermal treatment process.

In an embodiment, the additive supply unit comprises an additive reservoir (storage container) configured for storing and/or providing the additives and a mixing unit configured for mixing the raw material and the additive fed from the additive reservoir. Furthermore, the additive supply unit may comprise a conveying system (configured for conveying the raw material) and/or an inerting system (configured for providing and/or purging the raw material with an inert gas, such as argon, prior to feeding the raw material to the inductively heated packed bed reactor and charging the same with the raw material).

In an embodiment, the thermal treatment apparatus further comprises a molten phase processing unit in fluidic connection with the molten phase outlet of the inductively heated packed bed reactor.

The molten phase processing unit may in particular comprise a reactor configured for thermally treating the molten phase under oxidative conditions (e.g. in an atmosphere containing oxygen) and configured for separating the molten phase into fractions based on density differences (i.e. depending on their densities). The reactor may in particular be configured for combusting any carbon material in the molten phase which may then be discharged as gaseous carbon monoxide or carbon dioxide. The reactor may further be configured for separating metals contained in the molten phase from slag (for instance based on density differences) and may thereby allow the recovery of the metals, such as iron, copper, nickel, cobalt and/or aluminum.

In addition, the molten phase processing unit may further comprise a container upstream of the reactor and configured for collecting the molten phase discharged from the packed bed reactor via the molten phase outlet. Moreover, the molten phase processing unit may further comprise a conveying system configured for conveying the molten phase from the container to the reactor.

The thermal treatment apparatus further comprises a condenser in fluidic connection with the one or more gas outlets. The condenser is configured for depositing lithium species from a gaseous phase discharged from the inductively heated packed bed reactor via the one or more gas outlets. In addition, the condenser is configured for separating the deposited lithium species from an exhaust gas substantially free from lithium species.

The term "lithium species" as used herein, may in particular encompass lithium compounds, such as lithium salts or lithium oxide, and may also encompass elemental lithium. The term "substantially free from lithium species" as used herein, may in particular denote that lithium species, if any, may still be present in the exhaust gas in relatively minor amounts, in particular in a lower concentration than in the gaseous phase discharged from the inductively heated packed bed reactor.

In an embodiment, the condenser is configured for cooling the gaseous phase to a temperature lower than 1300° C. By taking this measure, lithium species may be efficiently deposited and separated from the exhaust gas, thereby allowing the recovery of the lithium species in high yield and/or purity.

In an embodiment, the thermal treatment apparatus further comprises an exhaust gas processing unit configured for processing the exhaust gas discharged from the condenser. The exhaust gas may contain among others phosphorus species discharged as part of the gaseous phase from the inductively heated packed bed reactor. The term "phosphorus species" as used herein, may in particular encompass phosphorus compounds, such as phosphorus-containing salts or phosphorus oxides, and may also encompass elemental phosphorus (such as $P_2$ or $P_4$).

In an embodiment, the exhaust gas processing unit comprises a combustion chamber configured for combusting the exhaust gas in an atmosphere containing oxygen (such as air). The exhaust gas processing unit, in particular the combustion chamber thereof, may in particular be configured for oxidizing phosphorus species and/or carbon monoxide discharged from the inductively heated packed bed reactor and contained in the exhaust gas, for instance to phosphorus pentoxide ($P_2O_5$) and/or carbon dioxide.

In an embodiment, the exhaust gas processing unit further comprises a dust separator (e.g. a cyclone) downstream of the combustion chamber and configured for separating substantially any solid impurities (such as metal oxides and/or heavy metal dust) from the exhaust gas.

In an embodiment, the exhaust gas processing unit further comprises a scrubber (wet separator, gas washer) downstream of the dust separator and configured for separating hydrolysable compounds (e.g. $P_2O_5$) from the exhaust gas by means of a washing liquid (which may be neutral, alkaline or acidic). By taking this measure, phosphorus pentoxide may be hydrolysed to phosphoric acid and as such may be efficiently separated from the exhaust gas by the washing liquid, thereby allowing the recovery of phosphorus.

In an embodiment, the exhaust gas processing unit further comprises a washing liquid supply unit comprising a washing liquid reservoir and configured for circulating the washing liquid through the scrubber. By taking this measure, a particularly efficient separation of phosphoric acid and recovery of phosphorus may be achieved.

In an embodiment, the exhaust gas processing unit further comprises a filtration unit downstream of the scrubber. By taking this measure, the exhaust gas may be finally cleaned before discharged into the environment.

In an embodiment, the exhaust gas processing unit further comprises a suction unit (e.g. a suction drawer blower) downstream of the filtration unit, which may be configured for discharging the (purified) exhaust gas into the environment.

In a second aspect, the present invention relates to a process for thermal treatment of a raw material containing lithium compounds and phosphorus compounds, the process comprising the steps of providing the raw material, optionally (mechanically) pretreating the raw material, optionally supplying additives to the raw material, feeding the raw material to an inductively heated, packed bed reactor, in particular an inductively heated packed bed reactor as described in connection with an apparatus for thermal treatment of a raw material containing lithium compounds and phosphorus compounds, thermally treating (heating) the raw material in the inductively heated packed bed reactor, such that at least part of the raw material including lithium compounds and/or phosphorus compounds is transferred into a gaseous phase and another part of the raw material forms a molten phase (comprising a metal alloy (wherein the content of lithium and/or phosphorus is reduced compared to the initial raw material)), discharging at least part of a gaseous phase comprising at least part of the transferred part of the raw material including lithium species and/or phosphorus species in a gaseous phase from the reactor via one or more gas outlets, discharging the molten phase from the reactor via a molten phase outlet, cooling the discharged gaseous phase in a condenser thereby depositing lithium species, and separating the deposited lithium species from an exhaust gas substantially free from lithium species.

In an embodiment, the raw material provided for the thermal treatment process comprises residues from processing of lithium-ion batteries and/or parts from lithium-ion batteries, in particular active material, electrodes and/or electrolyte material thereof. The raw material may contain lithium compounds and phosphorus compounds in various oxidation states and structures (i.e. combined with atoms or ions of other elements). Thus, the raw material may contain mixtures of several lithium- and/or phosphorus-containing compounds. In addition, the raw material may comprise other metals, in particular transition metals, such as at least one of iron, copper, nickel and cobalt, and/or aluminum. These metals may be present in elemental form and/or as salts and/or as oxides. Moreover, the raw material may comprise organic material, such as carbon or coke, for instance in an amount up to 30% by mass, and/or further inorganic materials, such as salts or oxides.

In an embodiment, the thermal treatment process comprises a pretreating of the raw material prior to its thermal treatment. In particular, the raw material may be mechanically pretreated and/or by density or magnetic separation.

In an embodiment, the step of pretreating the raw material involves a separation based on physical properties, such as density and/or magnetic differences.

In an embodiment, the step of pretreating the raw material includes a removal of carbon compounds. Lithium-ion battery residues may comprise a considerable amount of carbon compounds, for instance up to 30% mass content. While a certain content of carbon compounds in the raw material may be advantageous for thermally treating the raw material in an inductively heated, packed bed reactor according to an exemplary embodiment of the invention, e.g. for maintaining a CO-rich atmosphere, for reduction and/or as a fuel, a too high content of carbon compounds in the raw material to thermally treated may be disadvantageous. Thus, it might be advantageous to remove a part of the carbon compounds, for instance up to a content of less than 10% by mass, by pretreating the raw material. Since carbon compounds on the one hand and metal-rich phases on the other hand typically exhibit significant differences in density, a removal of a part of the carbon compounds may be efficiently achieved based on density differences, such as by means of a density separator. Additionally or alternatively, a removal of a part of the carbon compounds from metal-rich raw material may also be efficiently achieved based on magnetic differences, such as by means of a magnetic separator.

In an embodiment, the thermal treatment process comprises a step of supplying one or more additives to the raw material prior to its thermal treatment. In particular, the additives may be selected from the group consisting of mineral components, slag-forming oxides (e.g. silicon dioxide, calcium oxide, iron oxide, etc.), blast furnace slag, industrial or municipal residues, reactive carbon or carbon source, and mixtures thereof. Residue material from lithium-ion battery residues may contain only little or substantially no mineral components that may bind undesirable accompanying elements in a slag matrix. Thus, it may be desirable to add slag-forming oxides, such as silicon dioxide, calcium oxide, iron oxide or other slag-forming oxides, to the raw material prior to its thermal treatment, for instance up to 40% by mass content. Moreover, in order to stabilize certain metal oxides, it may be advantageous to add metallic components with for instance up to 20% by mass content. Also considered as additives are blast furnace slag or other industrial or municipal residues, which have good melting properties and ideally also contain metallic recyclables. As will be readily understood by a person skilled in the art, the exact composition of the additives may be adapted to the composition of the raw material. The additives may be stored in an additive reservoir or storage container and may be mixed with the raw material in a mixing unit.

In an embodiment, the additives are supplied in an amount up to 150 parts by mass per 100 parts by mass of the raw material (i.e. the resulting mixture contains up to 60% by weight of additives), in particular up to 100 parts by mass per 100 parts by mass of the raw material (i.e. the resulting mixture contains up to 50% by weight of additives), in particular up to 75 parts by mass per 100 parts by mass of the raw material (i.e. the resulting mixture contains up to about 42.9% by weight of additives), such as up to 66.7 parts by mass per 100 parts by mass of the raw material (i.e. the resulting mixture contains up to about 40% by weight of additives).

In an embodiment, the raw material which may be pretreated and/or mixed with one or more additives is fed to an inductively heated, packed bed reactor for instance by an appropriate conveying system. Preferably, the raw material is fed under an inert gas atmosphere (such as under an argon atmosphere) (in)to the inductively heated, packed bed reactor, which may be advantageous to achieve or maintain a substantially non-oxidizing gas atmosphere within the inductively heated, packed bed reactor.

In an embodiment, the inductively heated, packed bed reactor is charged with the raw material which may be pretreated and/or mixed with one or more additives from above.

The inductively heated, packed bed reactor suitable for use in a thermal treatment process according to an exemplary embodiment may in particular be an inductively heated, packed bed reactor as described in further detail above in connection with the thermal treatment apparatus according to an exemplary embodiment.

In an embodiment, the step of thermally treating includes a heating of the raw material to a temperature of from 1300 to 1700° C., in particular to a temperature of from 1300 to 1600° C., in particular to a temperature of from 1300 to 1500° C., in particular to a temperature of from 1300 to 1450° C. The heating may in particular involve an inductive heating by the inductively heated, packed bed reactor, in particular by means of one or more induction coils and a susceptor material. The heating may however also result from a combustion of fuel, for instance of carbon compounds contained in the raw material or added as additive.

In an embodiment, the step of thermally treating is carried out under reductive conditions. To this end, the step of thermally treating may be carried out for instance in a gas atmosphere containing carbon monoxide. Without wishing to be bound to any theory, it is assumed that lithium compounds and/or phosphorous compounds contained in the raw material may be at least partly reduced. For instance, it may be possible that at least a part of the lithium compounds is reduced to elemental lithium which may evaporate upon thermal treatment in the inductively heated packed bed reactor and may thus be transferred into a gaseous phase. It may also be possible that a gas atmosphere containing carbon monoxide may substantially prevent an oxidation (or re-oxidation) of lithium to lithium oxide. It may however also be possible that at least a part of the lithium compounds may be released from the raw material and transferred into a gaseous phase for instance in the form of lithium oxide. In addition, it may be possible that at least a part of the phosphorous compounds is reduced to elemental phosphorus or other phosphorous species that may evaporate upon thermal treatment in the inductively heated packed bed reactor and may thus be transferred into a gaseous phase. Moreover, it may be possible that at least a part of the other metals contained in the raw material, such as iron, copper, nickel and/or cobalt, may be at least partly reduced, in particular to their elemental form (such as elemental iron, copper, nickel and/or cobalt) which may melt upon thermal treatment in the inductively heated packed bed reactor and may thus be transferred into a molten phase comprising a metal alloy, wherein the content of lithium and/or phosphorus is reduced compared to the initial raw material.

In an embodiment, the step of thermally treating includes a (spatial) separation of at least part of the gaseous phase comprising at least part of the transferred part of the raw material including lithium species and/or phosphorus species in a gaseous phase from the molten phase. This separation may be achieved in that the gaseous phase tends to rise (stream upwards) within the reactor body of the inductively heated packed bed reactor, whereas the molten phase as well as any remaining solid and liquid phases of the raw material tends to sink (flow or fall downwards) within the reactor body of the inductively heated packed bed reactor. Moreover, due to the packed bed configuration of the inductively heated packed bed reactor, in particular by a specific arrangement or selected distribution of filler particles as exemplified above in connection with the thermal treatment apparatus, a separation of the gaseous phase and the molten phase may be facilitated or improved and an undesired contact between the phases may be minimized. Without wishing to be bound to any theory, it is assumed that the gaseous phase may preferentially stream upwards at the periphery or circumference of the packed bed reactor, in particular if the particle size of the filler particles is smaller at the periphery than at the center, whereas the molten phase as well as any remaining solid and liquid phases may flow or trickle downwards preferentially in the center or core part of the packed bed within the reactor body. As a result, the gaseous phase may be efficiently separated from the other phases in a manner with minimized contact between the phases, thereby minimizing undesired reactions between components of different phases, such as a consumption of lithium as a reducing agent for other metals.

In an embodiment, the molten phase optionally together with a solid and/or liquid phase comprising additives is discharged from the inductively heated packed bed reactor via a molten phase outlet. Preferably, the molten phase outlet is purged with an inert gas (or stream of gas), while the molten phase is discharged from the reactor via the molten phase outlet. By taking this measure, an undesired oxidation of elements in the molten phase (which may still have a temperature of about 1400° C. when discharged from the inductively heated packed bed reactor via the molten phase outlet) may be avoided. It might be advantageous if the inert gas does substantially not comprise nitrogen, which may otherwise lead to undesired reactions. Rather, the inert gas preferably comprises argon.

In an embodiment, the thermal treatment process further comprises a processing of the discharged molten phase and the optional solid and/or liquid phase in a molten phase processing unit. To this end, the thermal treatment process may further comprise collecting the discharged molten phase and the optional solid and/or liquid phase in a container and feeding the collected discharged molten phase and the optional solid and/or liquid phase, for instance discontinuously or batchwise, to a reactor, such as by means of a conveying system.

In an embodiment, the thermal treatment process (more specifically, the molten phase processing) further comprises a step of thermally treating the molten phase and the optional solid and/or liquid phase under oxidative conditions (in particular, in an atmosphere containing oxygen, such as air) in a reactor. The thermal treatment of the molten phase and the optional solid and/or liquid phase may be carried out at a temperature of from 1300 to 1600° C., in particular of from 1300 to 1500° C., in particular of from 1300 to 1450° C. At least part of the energy for thermally treating the molten phase and the optional solid and/or liquid phase may be provided by combustion of carbon or any other fuel materials still contained in the phases. By taking this measure, mineral components may melt and float as slag on the metal alloy, allowing a separation of slag from the metal alloy based on density differences. Thus, in an embodiment, the thermal treatment process further comprises a step of separating the molten phase and the optional solid and/or liquid phase into fractions based on density differences, i.e. depending on their densities. As a result, the metals, such as iron, copper, nickel, cobalt and/or aluminum, which have been contained in the raw material, can be recovered and recycled.

In an embodiment, the thermal treatment process comprises a step of discharging at least part of a gaseous phase comprising at least part of the transferred part of the raw material including lithium species and/or phosphorus species in a gaseous phase from the reactor via one or more gas outlets. In an embodiment, the gaseous phase may be discharged via two or more gas outlets located at axially different heights of the reactor body. By taking this measure, the gas flow through the packed bed may be improved and/or an (undesired) contact with other phases (such as the molten phase and/or any solid and/or liquid phase) may be reduced.

In an embodiment, the thermal treatment process comprises a step of cooling the discharged gaseous phase (which may have a temperature of about 1450° C. when discharged from the inductively heated packed bed reactor via the one or more gas outlets) in a condenser thereby depositing lithium species. For instance, the step of cooling the discharged gaseous phase in a condenser may include a cooling of the gaseous phase to a temperature lower than 1350° C., in particular lower than 1300° C. As a result, lithium species, such as lithium salts, lithium oxide and/or elemental lithium, may be deposited (in particular brought in a solid and/or liquid state) in the condenser and thus separated from an exhaust gas substantially free from lithium species. The term "substantially free from lithium species", as used herein, may in particular denote that lithium species, if any, may still be present in the exhaust gas in relatively minor amounts, in particular in a lower concentration than in the gaseous phase discharged from the inductively heated packed bed reactor.

In an embodiment, the lithium species may be recovered from the condenser in high yield, for instance in a yield of at least 50% of the lithium compounds in the raw material, in particular in a yield of at least 60%, such as at least 70%, of the lithium compounds in the raw material.

In an embodiment, the thermal treatment process further comprises a processing of the exhaust gas in an exhaust gas processing unit. To this end, the thermal treatment process may further comprise a step of combusting the exhaust gas in a combustion chamber in an atmosphere containing oxygen (e.g. air) such that phosphorus species (such as $P_2$ or $P_4$) and carbon monoxide are oxidized, in particular to $P_2O_5$ and $CO_2$, respectively.

In an embodiment, the thermal treatment process (more specifically, the exhaust gas processing) further comprises a step of removing substantially any solid impurities (such as metal oxides and/or heavy metal dust) from the (combusted) exhaust gas by means of a dust separator (e.g. cyclone), preferably at a temperature of at least 360° C. so as to prevent a resublimation of $P_2O_5$.

In an embodiment, the thermal treatment process (more specifically, the exhaust gas processing) further comprises a step of separating hydrolysable compounds (e.g. $P_2O_5$) from the exhaust gas by means of a washing liquid (which may be neutral, alkaline or acidic) in a scrubber (wet separator, gas washer). By taking this measure, phosphorus pentoxide may be hydrolysed to phosphoric acid and as such may be efficiently separated from the exhaust gas by the washing liquid, thereby allowing the recovery of phosphorus.

In an embodiment, the thermal treatment process (more specifically, the step of separating hydrolysable compounds from the exhaust gas) further comprises a circulating of the washing liquid through the scrubber by means of a washing liquid supply unit comprising a washing liquid reservoir. By taking this measure, a particularly efficient separation of phosphoric acid and recovery of phosphorus may be achieved.

In an embodiment, the thermal treatment process (more specifically, the exhaust gas processing) further comprises a step of filtrating the exhaust gas by means of a filtration unit. By taking this measure, the exhaust gas may be finally cleaned before discharged into the environment.

In a third aspect, the present invention relates to a method of recovering lithium and/or phosphorus from residue material of lithium-ion batteries (in particular of active material) comprising conducting a process for thermal treatment of a raw material containing lithium compounds and phosphorus compounds as described herein. Thus, the thermal treatment process and/or the thermal treatment apparatus as described herein may be used for the recovery of lithium and/or phosphorus from residue material of lithium-ion batteries, in particular active material thereof. Moreover, the thermal treatment process and/or the thermal treatment apparatus as described herein may be used for the recovery of other metals, such as iron, copper, nickel, cobalt and/or aluminum, from residue material of lithium-ion batteries, in particular active material thereof.

Before, referring to the drawings, exemplary embodiments will be described in further detail, some basic considerations will be summarized based on which exemplary embodiments of the invention have been developed.

According to an exemplary embodiment of the invention, a method for the treatment of active material, a fine-grained residue from lithium-ion battery processing, is provided. The active material, in which the contained lithium is bound in different metal oxide or iron phosphate structures, has a variable chemical composition, due to the fast development of new cell technologies and different pre-treatment methods. In addition to various lithium metal oxides, lithium iron phosphates and, possibly in the future, other structures, the active material also contains large amounts of carbon (up to 30% mass content) as well as residues from the cell structure and copper or aluminum foil residues, which may be volatile at high temperatures. It is desired to treat this active material in such a way that not only a molten metal alloy but also lithium and phosphorus can be recovered in high purity via a gas phase.

The apparatus used is an inductively heated reactor with a susceptor packed bed of graphite cubes, possibly also graphite blocks or graphite fragments, enabling an axially and radially even temperature profile. The reactor may have a selected distribution of the bulk material with respect to radially arranged different unit sizes. Thereby, smaller unit sizes surround the inner core filling in the form of a ring. This serves to reduce the inductive heat input in the edge of the bulk, leading to a reduced thermal load on the refractory material. This also allows the provision of an advantageous radial temperature profile. In addition, the penetration of the melting phase and consequently also the chemical attack of the refractory material is minimized. The reactor will also be extended by a new gas extraction concept. Here, the gas phase is removed by one, or, if necessary, by several gas extractors, which are located at axially different heights. This improves the gas flow through the ring filling and reduces the contact with other phases.

Depending on the carbon content, the active material may have to undergo an additional mechanical pre-treatment before it can be used as an input material. Since the contained carbon and the value-rich phases have large density differences, a density separation is possible for processing. A part of the carbon, which cannot be removed, reacts in the reactor or in the subsequent oxidation step and is used to maintain the CO-rich atmosphere and for reduction or as fuel. For the purpose of direct reduction, reactive coke may additionally be added to the feed material as a part of the additive mixture.

Since the active material itself hardly contains any mineral components, slag-forming oxides may also be added in order to allow undesirable accompanying elements to be bound in a slag matrix. As additives, mixtures of silicon dioxide, calcium oxide, iron oxide or other slag-forming oxides are used in different mass ratios, which are added to the active material with up to 40% mass content. In order to stabilize certain metal oxides, metallic components with up to 20% by mass content can be added to the mixture. Further suitable additives include blast furnace slag or other industrial or municipal residues, which have good melting properties and ideally also contain metallic recyclables. The exact composition of the insert mixture may be adapted to the composition of the active material.

The mixture of active material and additives is added to the bulk from above, and heated. At high temperatures, elemental lithium is discharged from the metal oxide or iron phosphate structure. The CO-rich atmosphere at this temperature largely prevents the reaction from lithium to lithium oxide, which is an important advantage of the process. If lithium oxide is formed at these temperatures, lithium could no longer be removed from the reactor via the gas phase. Even at very high temperatures, lithium oxide would be discharged with the mineral fraction. Traces of lithium oxide, which are potentially produced, are also discharged from the reactor as fine particles and thus do not reduce the purity of the obtained Li fraction. As a result, the formation of lithium oxide is inhibited and a gas stream containing high purity lithium is produced.

Concerning the gas phase, as soon as the input mixture reaches a temperature of 1300-1450° C., lithium and phosphorus, which is present after the reduction as $P_2$, enter the gas phase and can be removed from the reactor via the gas extractor. Since the mixture crosses the reactor from top to bottom and the reactions also take place further down in the reactor, temperatures of at least 1450° C. prevail within the core fill, in order to allow the evaporation or sublimation of lithium at any rate. After the gas phase leaves the reactor at temperatures of about 1450° C., it flows through a condenser in which lithium can be deposited and recovered in high purity. In a post-combustion chamber, the lithium-free exhaust gas is oxidized with air. Contained heavy metals are then filtered out in a hot gas cyclone. In a subsequent scrubber, $P_2O_5$ is converted to phosphoric acid and obtained as such.

Concerning the liquid phases, the mixture of active material and additives crosses the reactor downwards. The contained metal oxides of the active material are reduced after the release of lithium by the carbon of the insert mixture or by the CO-rich atmosphere, whereby a liquid metal alloy (Ni, Co, Cu, Fe, etc.) is created. The aluminum, which was already partially metallic in the active material, melts at 660° C. and is at least partially oxidized due to its high oxygen affinity. At the prevailing temperatures, alumina cannot be reduced or melted, but crosses the reactor in the form of a slag mixing phase (solid or liquid, depending on the additives). The residual carbon, at least part of the additives and other components of the active material are also still solid or partially liquid and are transported downwards by vibrations or their flow behavior in the reactor. It should be noted that the transport of these phases takes place primarily in the core fill in order to keep contact with the gas phase low. This separation of the two phases is made possible by the ring filling, which has smaller particle diameters. This local separation minimizes the contact of gaseous lithium to other oxides (e.g. $SiO_2$) and limits the consumption of lithium as a reductive agent. The reduced mixture leaves the reactor through an inert-gas-purged material discharge at the bottom of the reactor and is collected there. The mixture, which has a temperature of about 1400° C., is then fed to another reactor. In this reactor, preheated air or technically pure oxygen may be inflated onto the mixture. The heat released by the resulting combustion of carbon and potential additional fuel melts the mineral components. The resulting slag ($SiO_2$, CaO, $Al_2O_3$, etc.) floats on the metal alloy present. The high oxygen potential of the metals involved (primarily Co, Ni) compared to carbon makes this step possible without bringing the metals into the slag phase. The separation of the metal and slag phase takes place in the same unit and can be realized by the density difference of the two phases.

In a nutshell, in a process for the thermal treatment of active material, a metal- and carbon-rich residue from the treatment of lithium-ion batteries, the addition of additives and feeding to an inductively heated packed bed reactor enables the recovery of lithium in high purity via the gas phase. Furthermore, a low-lithium and low-phosphorus metal alloy as a molten phase can be recovered. The reactor setup may consist of at least one water-cooled induction coil within which an electrically non-conductive refractory material filled with graphite pieces is located. In radial direction the particle size of the graphite pieces may vary in order to optimise the heat input and limit the stress on the refractory materials. The high CO partial pressure enables the recovery of lithium via the gas phase. In a downstream condenser, which cools the gas to less than 1350° C., lithium is then recovered. The metal alloy leaves the reactor together with the mineral fraction, which may be present depending on the additives, via an inert-gas-purged discharge at the bottom of the reactor.

FIG. 1 illustrates an exemplary scheme of a thermal treatment apparatus 100 and a thermal treatment process according to an exemplary embodiment.

Initially, raw material is provided for instance from residues from processing of lithium-ion batteries and/or parts from lithium-ion batteries, in particular active material, electrodes and/or electrolyte material thereof.

The raw material is separated in a pretreatment unit 120, which may be designed as a separator or sifter. The carbon portion in the raw material is reduced up to a mass content of less than 10%. The separated carbon can be obtained as a by-product.

The raw material is fed into an additive supply unit 130 where the raw material is obtained from a raw material reservoir 136 and mixed in a mixing unit 134 with additives (e.g. CaO, $SiO_2$, C, etc.) from one or more additive reservoirs 132.

Via a conveying system 138 the powdered mixture reaches the upper part of an inductively heated, packed bed reactor 110 and is fed into the reactor 110.

The inductively heated, packed bed reactor 110 comprises a reactor body 112. In the interior of the reactor body (i.e. the reactor interior 115), there is a packed bed of susceptor material 116, such as graphite pieces. This bed is heated inductively by one or, if necessary, an arrangement of several induction coils 114 around the reactor body 112 to ensure the necessary reaction temperature of approx. 1450° C. Thus, the graphite pieces provide the necessary heat input and the reaction surface at the same time.

The feed mixture is heated upon entry by radiation and by contact with the inductively heated graphite pieces. The heat input breaks up the lithium metal oxide or lithium iron phosphate structures. Elemental lithium and oxygen are released, and a residual metal oxide is left behind. The released lithium is transferred to the gas phase, the oxygen reacts to CO and the metal oxides are reduced. A partially melt-liquid phase of metals is formed as well as a solid (or partially liquid) phase of additives, carbon and other components of the active material. These two phases move downwards together in the reactor body 112. In addition, there is a gas phase in the reactor body 112, which consists mainly of CO, Li and $P_2$. Due to the very low oxygen partial pressure and the high temperatures in the inductively heated packed bed reactor 110, the oxidation of the gaseous Li is limited and a thermochemical reduction of P is possible. $FePO_4$ in particular forms a proportion of $P_2$ through decay and reduction reactions, which is also present in the gas phase.

At the lower end of the reactor, the reduced material, which consists of a mineral and metallic part as well as carbon, is discharged via a molten phase outlet 119 and collected in a heated container 142, which already forms part of a molten phase processing unit 140. The material is further fed into another reactor 146 by a conveying system 144. In the reactor 146, air or oxygen is inflated to the 1400° C. hot (or partially cooled) material. The heat, provided by the reaction of oxygen with the residual carbon (and potential addition of fuel), allows the mineral components to be melted. Finally, the metallic and mineral phases can be separated due to their density directly in the reactor 146 and can be recovered as metals and slag, respectively.

The gas phase is discharged from the inductively heated packed bed reactor 110 via a gas outlet 118 with a temperature of approx. 1450° C. and consists mainly of CO, Li and $P_2$. It is fed into a condenser 150 in which the lithium is condensed at temperatures of lower than 1300° C. and discharged liquid so that it can be recovered.

The remaining gas flow is processed in an exhaust gas processing unit 160, where it initially enters a combustion chamber 162 for post-combustion, in which CO and $P_4$ are completely burned with air. A support burner ensures complete combustion, mainly during start-up operation. By adjusting the amount of excess air and heat dissipation of the combustion chamber 162, the combustion chamber outlet temperature is kept low.

The gas leaving the combustion chamber 162 consists of $N_2$, $CO_2$, $P_2O_5$, $O_2$, water and impurities. These impurities (e.g. metal oxides) are separated in the subsequent dust separator 164, such as a hot gas cyclone. The temperature in the dust separator 164 is set at a minimum of 360° C. to prevent resublimation of $P_2O_5$.

The gas flow from the dust separator 164 is fed into a scrubber 166. There, $P_2O_5$ is hydrolysed to phosphoric acid, impurities are washed out and the gas is cooled to temperatures below 100° C. The scrubber 166 is supplied with the washing water or the alkaline/acid washing liquid from a washing liquid reservoir 170 via a washing liquid supply unit 168 circulating the washing water or the alkaline/acid washing liquid are in a circle.

From the scrubber 166 the gas stream, which consists mainly of $N_2$, $CO_2$, $H_2O$ and $O_2$, enters a filtration unit 172 for final cleaning stage and the purified exhaust air leaves the system via a suction unit 174, such as a suction drawer blower.

Figure 2:
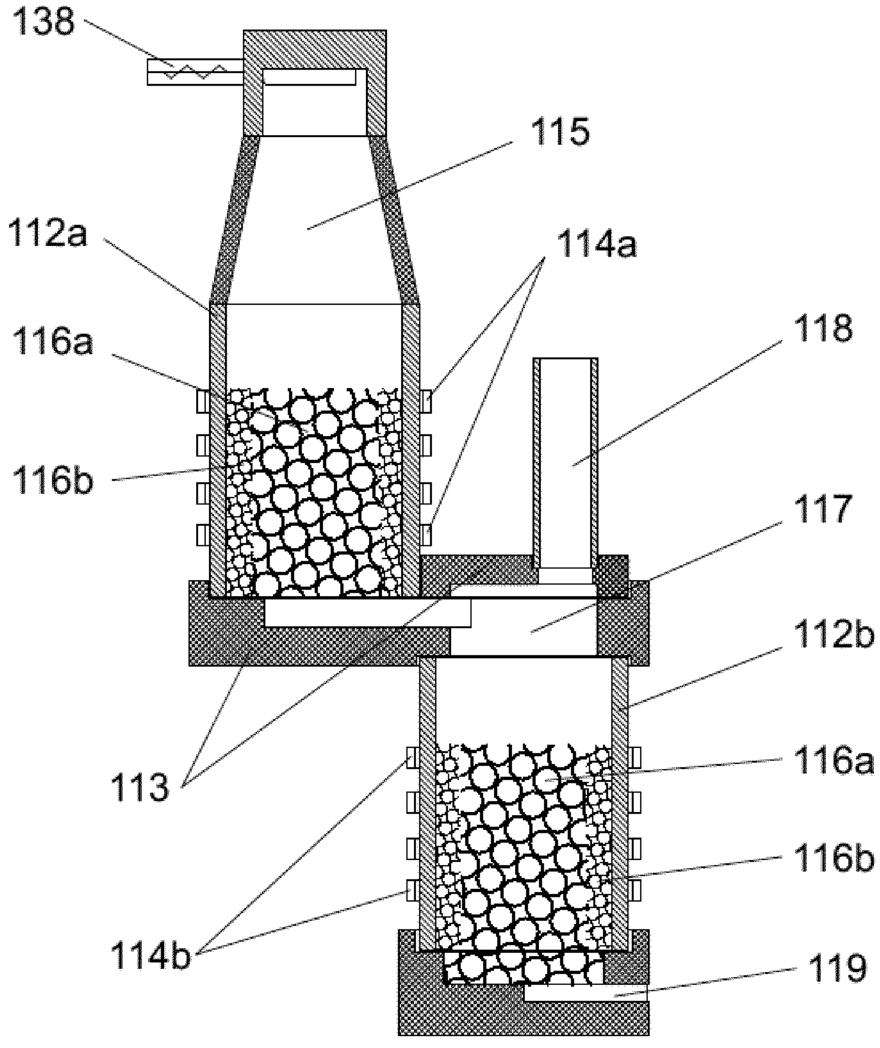
FIG. 2 illustrates a detail view of an exemplary embodiment of an inductively heated, packed bed reactor suitable for use in a thermal treatment apparatus and a thermal treatment process according to an exemplary embodiment.

FIG. 2 illustrates a detail view of an exemplary embodiment of an inductively heated, packed bed reactor suitable for use in a thermal treatment apparatus and a thermal treatment process according to an exemplary embodiment.

The raw material (e.g. feed mixture with carbon and additives) is fed directly onto the inductively heated bed via a conveying system 138. The bed is divided into a radially inner area (susceptor material inner packed bed 116*a*) in which larger graphite bodies ensure good inductive heating due to their dimensions. In the radially outer area (susceptor material outer packed bed 116*b*), the bed is in the form of small pieces of graphite. The purpose is to keep the inductive heating low at the edge area and to minimize the local slag flow in order to reduce the thermal and chemical load on the refractory material of the reactor body 112.

The reactor can be subdivided into an upper reactor part 112*a*, a connecting section 113 with one or more gas outlets 118 and a lower reactor part 112*b* with the molten phase outlet 119. The upper reactor part 112*a* comprises upper induction coils 114*a* and the lower reactor part 112*b* comprises lower induction coils 114*b*. In the upper part 112*a* of the reactor, the raw material is heated and melted. Due to gas-forming reactions (as well as viscosity and surface tension), a foam-like slag may be created resulting in an increase in volume compared with the raw material volume.

In the upper reactor part 112*a*, the foamed slag formed is guided in concurrent flow with the gas flow formed. The existing pressure gradient from the entry area to the gas outlet area thus supports the gravimetric flow of the slag. The slag formed leaves the upper part 112*a* of the reactor in a radially lateral discharge area which opens into the gas area 117.

Due to the high temperatures inside the reactor, the density of the gases is very low and their viscosity is increased. In the case of small cross-sections, the resulting high gas velocities can transport the foamed slag with the gas flow. In order to prevent an undesired discharge of foamed slag from the gas outlets, the gas velocity in the gas area is greatly reduced. The foamed slag is given the necessary residence time for partial outgassing and draining into the lower reactor part 112*b*.

The remaining reactions take place in the lower reactor part 112*b* and the gas formation runs in countercurrent to the slag flow. Due to the ever decreasing gas flows, the slag can flow downwards purely gravimetrically and can be discharged radially laterally at the molten phase outlet 119.

In order to degas the slag, the connecting section 113 is equipped with a gas area 117 as a connection to the lower reactor part 112*b*. The lower part 112*b* of the reactor is axially offset from the upper part 112*a* of the reactor. This also reduces the mutual influence of the upper and lower induction coils 114*a*, 114*b* and enables better different regulation of the power inputs.

In order to avoid falling below the required temperatures (due to the heat losses) in the connecting section, electrical heating elements (not shown in FIG. 2) can be built into the refractory material of the connecting section 113. The field strengths are significantly lower outside the coils during the operation of the induction heating with existing susceptor material inside. In addition, ferrite blocks can be positioned on the outside at sensitive points in order to better limit the external field strengths of the coils.

It should be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

LIST OF REFERENCE SIGNS

100 Apparatus
110 Inductively heated, packed bed reactor
112 Reactor body
112*a* Reactor body upper reactor part
112*b* Reactor body lower reactor part
113 Connecting section
114 Induction coil
114*a* Induction coils upper reactor part
114*b* Induction coils lower reactor part
115 Reactor interior
116 Susceptor material
116*a* Susceptor material inner packed bed
116*b* Susceptor material outer packed bed
117 Gas area
118 Gas outlet(s)
119 Molten phase outlet
120 Pretreatment unit
130 Additive supply unit
132 Additive reservoir
134 Mixing unit
136 Raw material reservoir
138 Conveying system
140 Molten phase processing unit
142 Container
144 Conveying system
146 Reactor
150 Condenser
160 Exhaust gas processing unit
162 Combustion chamber
164 Dust separator
166 Scrubber
168 Washing liquid supply unit
170 Washing liquid reservoir
172 Filtration unit
174 Suction unit

The invention claimed is:

1. An apparatus for thermal treatment of a raw material containing lithium compounds and phosphorus compounds, the apparatus comprising:

an inductively heated, packed bed reactor comprising a reactor body at least partially made of refractory material, the reactor body being surrounded by at least one induction coil, the reactor body being at least partially filled with a susceptor material, the inductively heated packed bed reactor being configured for transferring at least one part of the raw material including lithium compounds and phosphorus compounds into a gaseous phase and configured for forming a molten phase from another part of the raw material, the inductively heated packed bed reactor comprising one or more gas outlets and a molten phase outlet;

a condenser in fluidic connection with the one or more gas outlets and configured for depositing lithium species from the gaseous phase discharged from the inductively heated packed bed reactor via the one or more gas outlets and configured for separating the deposited lithium species from an exhaust gas substantially free from lithium species, wherein the susceptor material is arranged within the reactor body such that the particle size of the susceptor material varies in a radial direction, wherein the particle size of the susceptor material at the center of the reactor body is larger than the particle size of the susceptor material at the periphery of the reactor body.

2. The apparatus according to claim 1, comprising at least one of the following features:

wherein the raw material comprises residues from processing of lithium-ion batteries and/or parts from lithium-ion batteries;

wherein the at least one induction coil comprises a liquid-cooled induction coil;

wherein the susceptor material comprises graphite bodies;

wherein the mean particle size of the susceptor material at the center of the reactor body is at least four times larger than the mean particle size of the susceptor material at the periphery of the reactor body.

3. The apparatus according to claim 1, wherein the reactor body comprises an upper reactor part comprising one or more induction coils and a lower reactor part comprising one or more induction coils, wherein the upper reactor part and the lower reactor part are connected to each other via a connecting section equipped with a gas area.

4. The apparatus according to claim 3, wherein the upper reactor part and the lower reactor part are offset from each other at the connecting section.

5. The apparatus according to claim 1, comprising at least one of the following features:

wherein the inductively heated packed bed reactor comprises two or more gas outlets located at axially different heights of the reactor body;

the apparatus further comprising a pretreatment unit upstream of the inductively heated, packed bed reactor and configured for pretreating the raw material;

the apparatus further comprising an additive supply unit upstream of the inductively heated, packed bed reactor and downstream of the optional pretreatment unit, the additive supply unit being configured for supplying additives to the raw material;

the apparatus further comprising a molten phase processing unit in fluidic connection with the molten phase outlet, the molten phase processing unit comprising a reactor configured for thermally treating the molten phase under oxidative conditions and configured for separating the molten phase into fractions based on density differences;

wherein the condenser is configured for cooling the gaseous phase to a temperature lower than 1300° C.

6. The apparatus according to claim 1, further comprising an exhaust gas processing unit configured for processing the exhaust gas discharged from the condenser.

7. The apparatus according to claim 6, wherein the exhaust gas processing unit comprises a combustion chamber configured for combusting the exhaust gas in an atmosphere containing oxygen.

8. The apparatus according to claim 7, wherein the exhaust gas processing unit further comprises a dust separator downstream of the combustion chamber and configured for separating substantially any solid impurities from the exhaust gas.

9. The apparatus according to claim 8, wherein the exhaust gas processing unit further comprises a scrubber downstream of the dust separator and configured for separating hydrolysable compounds from the exhaust gas by means of a washing liquid.

10. The apparatus according to claim 9, comprising at least one of the following features:

wherein the exhaust gas processing unit further comprises a washing liquid supply unit comprising a washing liquid reservoir and configured for circulating the washing liquid through the scrubber;

wherein the exhaust gas processing unit further comprises a filtration unit downstream of the scrubber.

11. The apparatus according to claim 7, wherein the combustion chamber is configured for oxidizing phosphorus species discharged from the inductively heated packed bed reactor and contained in the exhaust gas to phosphorus oxides.

12. A process for thermal treatment of a raw material containing lithium compounds and phosphorus compounds, the process comprising the steps of:

providing the raw material, optionally pretreating the raw material, optionally supplying additives to the raw material, feeding the raw material to an inductively heated packed bed reactor comprising a reactor body at least partially made of refractory material, the reactor body being surrounded by at least one induction coil, the reactor body being at least partially filled with a susceptor material, the inductively heated packed bed reactor being configured for transferring at least one part of the raw material including lithium compounds and phosphorus compounds into a gaseous phase and configured for forming a molten phase from another part of the raw material, the inductively heated packed bed reactor comprising one or more gas outlets and a molten phase outlet;

thermally treating the raw material in the inductively heated packed bed reactor, such that the at least one part of the raw material including lithium compounds and phosphorus compounds is transferred into the gaseous phase and the another part of the raw material forms the molten phase, discharging at least part of the gaseous phase comprising at least part of the transferred part of the raw material including lithium species and phosphorus species in the gaseous phase from the reactor via the one or more gas outlets, discharging the molten phase from the reactor via the molten phase outlet, cooling the discharged gaseous phase in a condenser thereby depositing lithium species, and separating the deposited lithium species from an exhaust gas substantially free from lithium species;

wherein the susceptor material is arranged within the reactor body such that the particle size of the susceptor material varies in a radial direction, wherein the particle size of the susceptor material at the center of the reactor body is larger than the particle size of the susceptor material at the periphery of the reactor body.

13. The process according to claim 12, comprising at least one of the following features:

wherein the raw material comprises residues from processing of lithium-ion batteries and/or parts from lithium-ion batteries;

wherein the optional step of pretreating the raw material includes a removal of carbon compounds;

wherein the optional step of pretreating the raw material involves a separation based on physical properties;

wherein the optional step of supplying additives to the raw material comprises supplying additives selected from the group consisting of mineral components, slag-forming oxides, blast furnace slag, industrial or municipal residues, reactive carbon or carbon source, and mixtures thereof;

wherein the optional step of supplying additives to the raw material comprises supplying additives in an amount up to 150 parts by mass per 100 parts by mass of the raw material.

14. The process according to claim 12, comprising at least one of the following features:

wherein the step of thermally treating includes a heating of the raw material to a temperature of from 1300 to 1700° C.;

wherein the step of thermally treating is carried out under reductive conditions;

wherein the step of thermally treating is carried out in a gas atmosphere containing carbon monoxide;

wherein the step of thermally treating is adapted such that a reaction from lithium to lithium oxide is substantially prevented;

wherein the step of thermally treating includes a reduction of at least part of the other part of the raw material;

wherein the step of thermally treating includes a separation of at least part of the gaseous phase comprising at least part of the transferred part of the raw material including lithium species and phosphorus species from the molten phase.

15. The process according to according to claim 12, comprising at least one of the following features:

wherein the molten phase outlet is purged with an inert gas, while the molten phase is discharged from the reactor via the molten phase outlet;

wherein the molten phase is discharged via the molten phase outlet together with a solid and/or liquid phase comprising optional additives;

the process further comprising processing the discharged molten phase and the optional solid and/or liquid phase in a molten phase processing unit;

the process further comprising collecting the discharged molten phase and the optional solid and/or liquid phase in a container and feeding the collected discharged molten phase and the optional solid and/or liquid phase to a reactor;

the process further comprising thermally treating the molten phase and the optional solid and/or liquid phase under oxidative conditions in the reactor;

wherein the step of cooling the discharged gaseous phase in the condenser includes a cooling of the gaseous phase to a temperature lower than 1350° C.;

wherein the lithium species are recovered from the condenser in a yield of at least 50% of the lithium compounds in the raw material.

16. The process according to claim 12, further comprising processing the exhaust gas in an exhaust gas processing unit.

17. The process according to claim 16, further comprising combusting the exhaust gas in a combustion chamber of the exhaust gas processing unit in an atmosphere containing oxygen such that phosphorus species and carbon monoxide are oxidized.

18. The process according to claim 17, further comprising removing substantially any solid impurities from the exhaust gas by means of a dust separator of the exhaust gas processing unit at a temperature of at least 360° C.

19. The process according to claim 18, further comprising separating hydrolysable compounds from the exhaust gas by means of a washing liquid in a scrubber of the exhaust gas processing unit and recovering the hydrolysable compounds.

20. The process according to claim 19, further comprising at least one of the following features:

circulating the washing liquid through the scrubber by means of a washing liquid supply unit of the exhaust gas processing unit comprising a washing liquid reservoir;

filtrating the exhaust gas by means of a filtration unit.

* * * * *